United States Patent
Eggers et al.

(10) Patent No.: US 7,312,723 B2
(45) Date of Patent: Dec. 25, 2007

(54) AUTOMOBILE INFRARED NIGHT VISION DEVICE

(75) Inventors: Helmuth Eggers, Ulm (DE); Gerhard Kurz, Wendlingen (DE); Juergen Seekircher, Ostfildern (DE); Thomas Wohlgemuth, Aichtal (DE)

(73) Assignee: DaimlerChrysler AG, Stuttgart (DE)

( * ) Notice: Subject to any disclaimer, the term of this patent is extended or adjusted under 35 U.S.C. 154(b) by 96 days.

(21) Appl. No.: 10/493,530

(22) PCT Filed: Jan. 20, 2003

(86) PCT No.: PCT/EP03/00483

§ 371 (c)(1),
(2), (4) Date: Apr. 22, 2004

(87) PCT Pub. No.: WO03/064213

PCT Pub. Date: Aug. 7, 2003

(65) Prior Publication Data

US 2004/0257442 A1    Dec. 23, 2004

(30) Foreign Application Priority Data

Jan. 28, 2002    (DE) ................................ 102 03 413

(51) Int. Cl.
G08G 1/017    (2006.01)
G08G 1/054    (2006.01)

(52) U.S. Cl. ...................... 340/937; 340/461; 340/903; 340/436; 348/199

(58) Field of Classification Search ................ 340/937, 340/461, 903, 436, 435, 932.2; 348/115, 348/148; 382/199, 190
See application file for complete search history.

(56) References Cited

U.S. PATENT DOCUMENTS

| 5,404,225 | A | * | 4/1995 | Bushman ..................... 356/364 |
|---|---|---|---|---|
| 5,414,439 | A | * | 5/1995 | Groves et al. .................. 345/7 |
| 5,729,016 | A | * | 3/1998 | Klapper et al. ............. 250/334 |
| 5,949,331 | A | | 9/1999 | Schofield |
| 6,420,704 | B1 | * | 7/2002 | Berenz et al. ............... 250/330 |
| 6,472,977 | B1 | | 10/2002 | Poechmueller |
| 6,611,202 | B2 | * | 8/2003 | Schofield et al. ........... 340/461 |
| 6,690,268 | B2 | * | 2/2004 | Schofield et al. ........... 340/438 |
| 6,792,147 | B1 | * | 9/2004 | Saka et al. ................... 382/199 |
| 6,897,892 | B2 | * | 5/2005 | Kormos ....................... 348/148 |
| 2002/0130953 | A1 | * | 9/2002 | Riconda et al. ............. 348/115 |
| 2005/0065683 | A1 | * | 3/2005 | Remillard et al. ............ 701/36 |

FOREIGN PATENT DOCUMENTS

| DE | 40 07 646 | A | 9/1991 |
|---|---|---|---|
| DE | 197 36 774 | A | 2/1999 |
| EP | 1 024 057 | A | 8/2000 |
| EP | 1 079 611 | A | 2/2001 |
| WO | WO 02 36389 | A | 5/2002 |

\* cited by examiner

*Primary Examiner*—Jeffery Hofsass
*Assistant Examiner*—Hoi C. Lau
(74) *Attorney, Agent, or Firm*—Akerman Senterfitt; Stephen A. Pendorf; Yonghong Chen

(57) ABSTRACT

The invention relates to an automobile infrared-night viewing device comprising an infrared camera used to receive image data representing the surroundings of the automobile. Said device also comprises an image processing unit which is connected to the infrared-camera and which processes the image data supplied by said camera in such am manner that a continuous image section from the supplied image data is selected and said selected data is retransmitted to a display. Said display then completely or almost completely reproduces the selected data, thereby renouncing any other further representations of the image data. Preferably, the selection of the image data is made according to the speed of the vehicle, the surroundings of the vehicle or the driver.

9 Claims, No Drawings

AUTOMOBILE INFRARED NIGHT VISION DEVICE

CROSS REFERENCE TO RELATED APPLICATION

This application is a national stage of PCT/EP03/00483 filed Jan. 20, 2003 and based upon DE 102 03 413.3 filed Jan. 28, 2002 under the International Convention.

BACKGROUND OF THE INVENTION

1. Field of Invention

The invention relates to an automobile infrared night vision device, and to a vehicle having such a device.

2. Related Art of the Invention

DE 197 36 774 A1 discloses a method for displaying information in a motor vehicle, in the case of which there is displayed on a display unit only a section of particular relevance from an image recorded by a daylight camera in a vehicle. In this case, the appropriate image data are selected from the overall image starting from a selection criterion. The contours of traffic signs within the daylight picture serve here as selection criterion. A simple and comprehensible representation of a traffic sign is displayed as a result to the vehicle driver, in particular as a reminder function.

Automobile night vision devices are disclosed in DE 39 32 216 C2 and DE 40 07 646 A1.

These show a camera that has a sensitivity in the nonvisible frequency range of light, for example with a wavelength of between 800 nm and 2000 nm. Moreover, these references show light sources for illuminating the surroundings that emit polarized or non-polarized infrared light. The infrared light reflected from the surroundings is picked up by the infrared camera and imaged on a display device that is arranged in the field of view of the vehicle driver, for example as a head-up display. In this case, the image data picked up by the camera are reproduced by the display unit. The known automobile night vision devices are difficult to handle for the user and turn out not to be very useful.

Also known is a night vision vision system that has an image processing unit interposed between the IR camera and the display. In this case, the image data of the IR camera are subjected before being displayed to simple processing for the purpose, in essence, of freeing the signal from noise components.

SUMMARY OF THE INVENTION

It is the object of the invention to specify an automobile infrared night vision device that the driver or vehicle occupants find better or can use more simply and find more useful, and to specify a vehicle that is equipped with such an automobile infrared night vision device.

Advantageous developments of the invention are the subject matter of subclaims.

The invention assumes that the image data picked up by the infrared camera and which represent the surroundings of an automobile are fed to an image processing unit that is connected to the infrared camera. This image processing unit is designed such that it can be controlled by means of a control unit such that a coherent region of the image data fed are selected, and these selected data are then reproduced in a format-filling fashion on the display connected to the image processing unit.

In this case, the display is arranged in the field of view of the driver such that he can absorb the selected IR image data illustrated in the display without, or virtually without, a disturbing distraction from directly viewing the surroundings. The image data received from the infrared camera, which are visualized with the aid of the image processing unit and the display, represent information relating to the distribution of heat in the surroundings lying outside the visible region of the light spectrum. These image data can be supplemented by further image data from the visible frequency range of light that can be picked up by the infrared camera, subsequently processed and reproduced.

The automobile IR night vision system forming the basis of the invention of the applicant is not so much intended as an information display in the meaning of a traffic sign display corresponding to DE 197 36 774 A1 for pointing out or recalling currently valid traffic controls, but rather primarily serves to improve the view of a motor vehicle driver, in particular at night, or weather conditions that impair sight. The display of such a system that improves vision correspondingly has the task of providing the driver in an easily comprehensible fashion with the current traffic situation, which is difficult to grasp. In order to implement the this object on which the invention is based, it is necessary to define image data other than the selection criteria known from the recognition of traffic signs in the daylight range. Consequently, within the scope of the invention two novel and inventive selection criteria are described for selecting coherent areas within IR images. One selection criterion is derived from the sensor data of a vehicle speed sensor while, alternatively, another selection criterion is derived from the sensor data of a sensor for detecting the surroundings.

The selection process, that is to say the selection of a section—thus, of a coherent area of the image data fed to the image processing unit—is firstly used to make a selection and also secondly used to fix a magnification factor that is determined by size/format of the section and size/format of the display. Here, the image data to be reproduced can be adapted to the format of the display in which specific sections of the selected image data that are not correlated with the display format are not brought to display.

By selecting the received image data it is possible for a section of the received image data that includes image data of particular interest to the user, and thus information of particular relevance, to be made effectively accessible very easily to the user of the night vision device, that is to say the driver or the passenger in the vehicle.

This automobile infrared night vision device is equipped here with an image processing unit that permits image processing in real time so that the IR image data picked up and selected can be reproduced without a relevant loss of time, and/or selection can be adapted to the subsequent reproduction without a relevant loss of time. This ensures the immediate display of the current situation that is required for use in automobiles. The acceptance of such a mobile infrared night vision device to the user is achieved to a special extent thereby, since he can respectively perceive the current information on the surroundings, on the one hand directly through the eyes in the visible light spectrum without the interposition of the infrared night vision device, and on the other hand with the interposition of the infrared night vision device. When his view of the surroundings is inadequate, for example at night, in twilight or in fog or similar conditions, this permits him through the current to supplement the same situation of the surroundings with a relevant enlarged section of the infrared image data in a simple and convenient way, and to obtain therefrom optimized information on the surroundings, and this improves traffic safety.

According to a preferred embodiment of the invention, a sensor that is connected to the control unit is provided for detecting the vehicle speed. The size of the selection of the image data is controlled as a function of the vehicle speed with the aid of the detected speed, which is formed with the assistance of the tachometer, for example. That is to say, a small section is preferably selected for a high speed and reproduced greatly enlarged on the display. This ensures that the region ahead of the automobile, which is further away and relevant for a relatively high speed, is reproduced in the display of the infrared night vision device, while the regions immediately in front of the vehicle, which are not relevant in the case of high speeds, are not reproduced. Conversely, in the case of low speeds selection of the image data is performed such that a large section of the image data fed to the image processing, or all the image data, if appropriate, are brought to the display for reproduction. This ensures that in the case of a lower speed the entire near zone in front of the vehicle is detected in the manner of a wide-angle lens, and is reproduced by the infrared night vision unit together with the corresponding thermal information. The image data to be reproduced are thereby selected as a function of situation and speed. This permits a very reliable and convenient intuitive use of the information from the night vision device.

It has proved to be particularly advantageous that automobile night vision devices are provided with a sensor for detecting the vehicle surroundings that is connected to the control unit in such a way that the image processing unit controls the selection of the image data as a function of the detected data of the vehicle surroundings. It is possible thereby for the data that are to be reproduced to be selected from the recorded data as a function of the detected situation of the surroundings, and this enables the driver to absorb more effectively the information that is made available.

For example, the sensor is suitable for detecting the line of the road such that, for example, the sensor detects the occurrence of a left-hand or right-hand bend, a straight, etc. and correspondingly selects the image data, and thus the image data to be reproduced, such that in accordance with the course of driving the right-hand portion of the fed image data are predominantly selected given a right-hand bend, the left-hand portion of the fed image data are selected given a left-hand bend, and the central portion of the image data are selected given a straight, these data then being reproduced. In addition to the selection of the image data as a function of the line of the road, the size of the selected section is preferably additionally selected as a function of speed. This leads to an optimized reproduction, as a function of the line of the road and of speed, of the infrared image data, which in each case reproduce the relevant information on the surroundings in a way that is reliable and can be absorbed effectively by the user.

In addition, it has proved worthwhile to use sensors to detect the weather situation of the surroundings and to control the selection of the image data as a function thereof. Given good, dry or sunny weather it has proved to be effective to select the section to be small, while in the case of damp weather or rain the section of the data to be reproduced from the data recorded is selected to be less small, and the section is selected to be even larger in the event of an icy surface or snowfall or fog. This ensures that the respectively relevant sections of the data are made available to the user as a function of the weather situation, and thus in a fashion adapted to the different driving behavior required of the driver, such that the user can drive the vehicle as safely as possible. Provided as a particularly suitable sensor for detecting the weather situation is a temperature sensor that is integrated in the vehicle and whose sensor signal can also be used by various other systems in the vehicle.

It has proved, moreover, worthwhile to design the sensor for detecting the vehicle surroundings to the effect that it is suitable for detecting the time of day or the day/night situation, and this can be implemented, for example, by a clock or an ambient light sensor. This sensor is connected to the control unit, which controls the image processing unit to the effect that the section of the fed image data is selected to be smaller or larger as a function of temperature or day/night situation. In particular, the image section is selected to be small given high temperature or in daylight, while it is selected to be appropriately larger given darkness/night or low temperature.

It has proved to be particularly worthwhile to provide a sensor for detecting the surroundings, for example a camera, which can be identical to the infrared camera, which in conjunction with an image processing unit classifies or categorizes the detected image signal in terms of the type of traffic situation obtaining, that is to say town situation, in particular intersection or side street, and/or country road or freeway. This classification or categorization is then used to select different sizes for the section of the data, which are to be reproduced, from the data fed to the image processing unit, and to displace it in the right-hand area of the fed image data, particular given situations on the country road or in the side streets, since particular vigilance is to be directed at cyclists, pedestrians and the like in these traffic situations, in particular. By contrast, in a freeway situation it is preferred to select an alignment of the sections in the central area of the fed image data. This adaptation of the selection of the section, and thus also of the enlargement, as a function of the situation ensures that the user is provided with the information he requires without a multiplicity of items of information of little relevance or none. It is ensured thereby that the limited attention of the user is fully and completely directed to the important information, and that safe driving behavior is thereby rendered possible.

In addition to the camera with an assigned image processing unit, it has proved to be worthwhile to classify or categorize with the aid of a navigation device.

The night vision device is preferably provided with an input unit for the user to input one or more selection criteria, for example magnification factor and/or size of the image section and/or the position of the image section. The user can thereby feed these selection criteria to the image processing unit via the control unit, and control the reproduction of the automobile infrared night vision device in accordance with his requirements or wishes. In particular, it is possible for the user to select various selection criteria individually or jointly in combination with one another, for example the measure of the dependence of the selection on the vehicle speed, on the temperature, the time of day, the weather situation or the line of the road.

It is also possible, moreover, for the night vision device to have a detection system for the line of sight of the user. Said system can be used by the user to displace this section in the infrared image data fed to the image processing unit. This selection is established by a confirmation signal and retained until renewed confirmation. This confirmation can be done, for example, by blinking—detected by the detection system itself—or by actuating a key or by speech input. A device known per se is used in this case to detect the line of sight. Examples of this are known from the patent literature and specialist journals. It is preferred for this purpose to make use of a camera system that detects the area of the driver or passenger, the image data thereof in the visible light region being evaluated to the effect that the line of sight is detected. For example, it is detected whether the eyes are directed to the right, such that the control unit is used to displace a selection of the infrared image data to the right, while given a line of sight to the left the image section from the infrared image data fed to the imaging unit is displaced to the left. Consequently, the automobile infrared night vision device appropriately selects and displays the area of the surroundings observed in a targeted fashion by the user. User information that is very informative and helpful is thereby rendered possible.

Integrating the inventive automobile infrared night vision device in a vehicle, in particular with the use of the sensors that are provided in the vehicle and are used in parallel by other systems implemented in the vehicle, for example speedometer, light/dark sensor, timer, creates a vehicle that enables the user to handle the vehicle very safely even under difficult conditions such as, for example, darkness, fog, twilight and the like. This is achieved, in particular, by making available to the driver, in addition to the usual view onto the surroundings of the vehicle, a second view, the IR view onto the relevant area of the surroundings in the nonvisible near infrared frequency range of the light by illustrating it on a display in a field of view, in particular in the form of a head-up display.

In addition to the formation of a head-up display, it has also proved worthwhile the display in the form of a large matrix display which, in addition to displaying the infrared image data, also reproduces further data relevant to the vehicle, for example the vehicle speed, the operating temperature, the ambient temperature etc. This display therefore additionally takes over the function of the central vehicle information cockpit, and thereby replaces the latter.

It is preferred in this case to use a CMOS infrared camera that has a logarithmic sensitivity. This is arranged fastened in the upper region of the windshield with a fixed forward alignment, and with an image processing unit directly adjacent to it, preferably on the roofliner of the vehicle. These are connected to the display unit, which is offset from the IR camera and the image processing unit. The display unit is arranged in the vehicle in the region of the cockpit such that the image data displayed are in the user's field of view. The control unit, which includes an input unit for the user, is preferably accommodated in the operating console of the vehicle. This arrangement of the components of the automobile infrared night vision device in the vehicle produces an arrangement that is easy to operate and scarcely distracts the user's attention and thereby creates safety.

The invention claimed is:

1. An automobile IR night vision device, comprising:
    an IR camera for recording image data that represent the surroundings of an automobile,
    a display for displaying image data fed to it,
    an image processing unit that is connected to the IR camera and is suitable for processing the image data fed from the IR camera,
    and a control unit for controlling the IR night vision device,
    wherein image data representing a coherent image section is selected with the aid of a selection criterion in the course of processing from the fed image data, and the selected image section is passed on for displaying to the display, and
    wherein the selection criterion is parameterized on the basis of data from a sensor for detecting the vehicle surroundings adapted for categorizing the detected surroundings in terms of traffic situations, and the control unit parameterizes the selection criterion as a function of the detected, categorized traffic situation for selection and alignment of different sizes of data which are fed to the image processing unit and reproduced on the display.

2. The automobile IR night vision device according to claim 1, wherein the sensor for detecting the vehicle surroundings is adapted for detecting the weather situation, and the control unit parameterizes the selection criterion as a function of the detected weather situation.

3. The automobile IR vision device according to claim 1, wherein the sensor for detecting the vehicle surroundings is adapted for detecting the time of day or the day/night situation, and the control unit parameterizes the selection criterion as a function of the detected time of day or the day/night situation.

4. The automobile IR night vision device according to claim 1, wherein the sensor for detecting the vehicle surroundings is adapted for categorizing the detected surroundings in terms of traffic situations, including at least one of in town, on a country road, and on a freeway.

5. The automobile IR night vision device according to claim 1, wherein the control unit is connected to an input unit for inputting one or more connection criteria by the user.

6. The automobile IR night vision device according to claim 5, wherein the input unit has a sensor for detecting the line of sight of the user, and in that the detected line of sight is used to establish the selection.

7. The automobile IR night vision device according to claim 1, wherein it has an IR light source for eliminating the surroundings with the aid of near IR light.

8. The automobile IR night vision device according to claim 1, wherein the image processing unit permits processing of the image data in real time.

9. An automobile IR night vision device, comprising:
    an IR camera for recording image data that represent the surroundings of an automobile,
    a display for displaying image data fed to it,
    an image processing unit connected to the IR camera and adapted for processing the image data fed from the IR camera,
    and a control unit for controlling the IR night vision device,
    wherein image data representing a coherent image section is selected with the aid of a selection criterion in the course of processing from the fed image data, and the selected image section is passed on for displaying to the display,
    wherein the selection criterion is parameterized based on data from a vehicle speed sensor, and
    wherein the size/format of the display is determined by fixing a magnification factor based on data from the vehicle speed sensor.

* * * * *